Nov. 30, 1943. J. A. CONTI 2,335,583
VELOCIPEDE FRAME AND METHOD OF MAKING IT
Filed Dec. 17, 1940
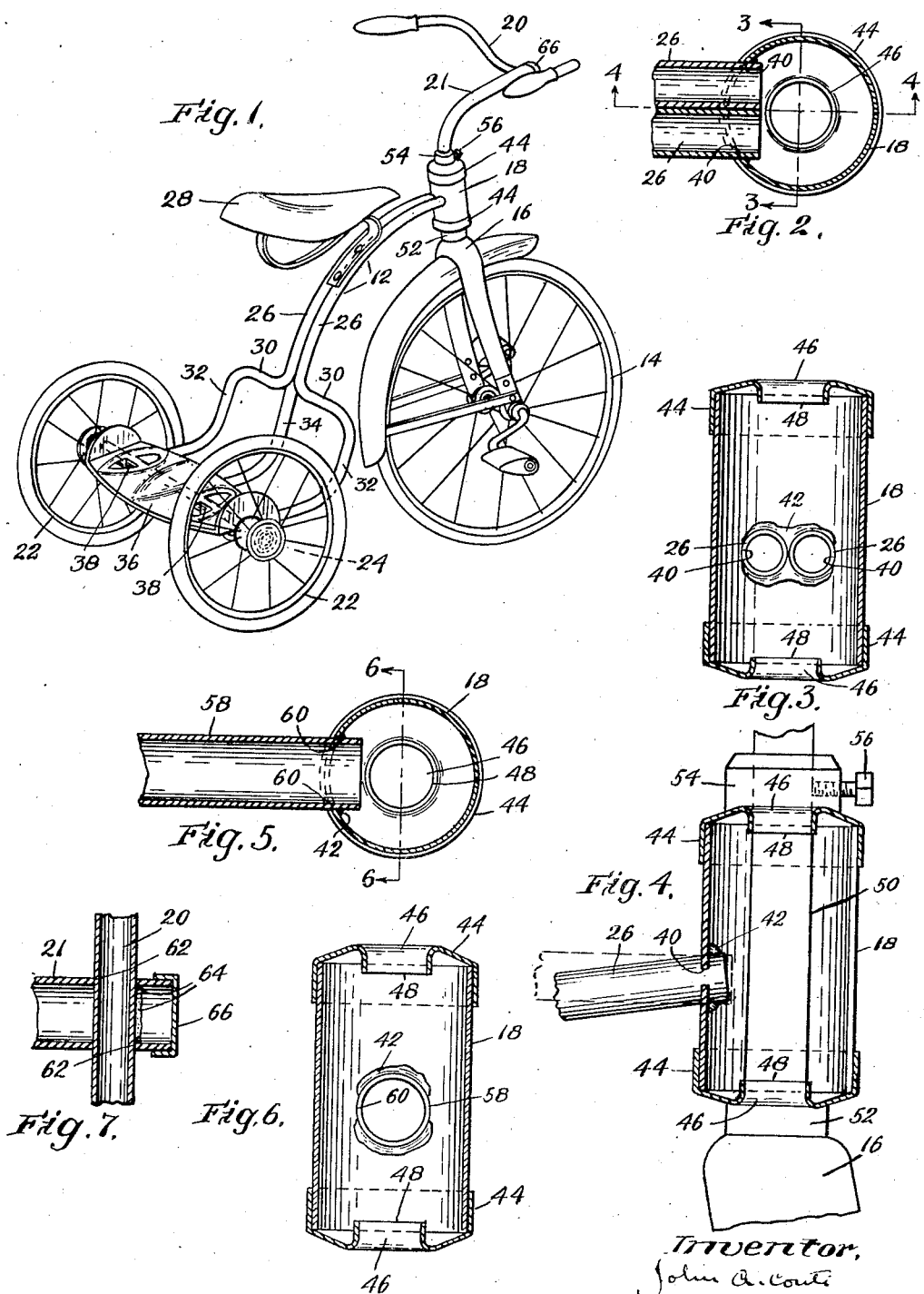
Inventor,
John A. Conti
by T. T. Greenwood
atty Patented Nov. 30, 1943

2,335,583

UNITED STATES PATENT OFFICE 2,335,583

VELOCIPEDE FRAME AND METHOD OF MAKING IT

John A. Conti, East Templeton, Mass., assignor to Hedstrom-Union Company, Gardner, Mass., a corporation of Massachusetts Application December 17, 1940, Serial No. 370,489

5 Claims. (Cl. 280—281)

This invention relates to velocipedes and as illustrated herein relates more particularly to velocipede frames.

Heretofore it has been the practice to butt weld the front end portion of the backbone tube to the outer face of the steering fork tube. This has been the practice with either one tube or two tube velocipede backbone construction. This method of securing together the backbone and the steering fork tube has not been altogether satisfactory. When the parts have been butt welded a rough joint is formed which must either be ground off, thus weakening the joint or the joint has to be covered by a shield, which increases materially the cost of making velocipede frames.

One object of the present invention is to provide a construction wherein the above difficulties are obviated. To this end and as illustrated, the steering fork tube is made considerably larger than the backbone tube and is provided with an opening arranged to receive the forward end portion of a one tube backbone. The end of the backbone tube extends into the interior of the steering tube to provide a ledge for receiving the welding material. The parts are welded together by arc welding, the welding electrode being extended through the open end of the large steering fork tube, the steering fork tube being made large enough and short enough for this purpose. By constructing the frame of the velocipede in the manner set forth above, the joint between the end of the backbone tube and the steering fork tube is free from any welding material and hence it is not necessary either to perform any grinding operation or to cover the joint by a shield. Furthermore, the joint between the backbone tube or tubes and the steering fork tube is stronger since as much welding material may be used as is necessary to provide a strong joint. The construction is substantially less expensive since the grinding operation or the shield is dispensed with.

The invention above described is not limited to assembling the backbone and steering post tubes of velocipedes but can also be used in uniting the backbone tube to the rear axle supporting tube and the handle bar to its supporting post and such construction is embraced by the present invention.

Another object of the invention is to provide an improved method of uniting cross tubes of velocipedes.

Other objects of the present invention are to improve generally the construction of velocipedes.

With the above and other objects and features in view, the invention will now be described with reference to the accompanying drawing in which:

Fig. 1 is a perspective view of a velocipede having a pair of backbone tubes and a steering fork tube joined together by welding at the inside of the steering fork tube in accordance with the present invention;

Fig. 2 is a view in section extending substantially horizontally through the backbone tubes and the steering fork tube;

Fig. 3 is a view in section taken along the line 3—3 of Fig. 2;

Fig. 4 is a view in cross-section taken along the line 4—4 of Fig. 2;

Fig. 5 is a view similar to Fig. 2 illustrating a modification of the invention wherein only one backbone tube is used;

Fig. 6 is a view taken along the line 6—6 of Fig. 5; and

Fig. 7 is a section through the handle bar and its supporting post of Fig. 1 and illustrating the two tubes united in accordance with the present invention.

Referring now to the drawing, the velocipede comprises a backbone 12, a front or steering wheel 14 with its fork 16 extending through the substantially vertical steering fork tube 18, handle bar 20, its supporting tube 21 and rear wheel 22 on a rear axle 24.

The backbone 12 includes a pair of tubes 26 which are parallel and close together in the forward part of the frame and under a seat 28 which is fixed to the backbone as will later be described. The backbone tubes are arcuately curved in a vertical plane and the rear part thereof have outwardly divergent sections 30 which are substantially at right angles with the fore part of the backbone 12. The tubes 26 at the outer ends of the intermediate divergent sections 30 are bent downwardly into spaced parallel relation with each other and are curved downwardly as at 32 in a vertical plane and become horizontal adjacent to the rear axle 24 where they are close to the rear wheels 22. A third tube 34 is disposed midway between the two portions 32 and is curved similarly to the downwardly curved portions of the backbone tubes 26. The upper end of the tube 34 has its upper end portion located at the juncture formed when the tubes 26 are bent outwardly to form the sections 30 and the upper end portion of the tube 34 is rigidly welded to both tubes 26. The rear axle preferably although not necessarily overlies the horizontal parts of the backbone tubes and is welded thereto.

The step plate 36 overlies the rear axle and the horizontal portions of the backbone tubes 26. The step plate is provided with down turned ears 38 which are struck out from the step plate and form a channel part in which the rear axle 24 is located and which are spot welded to the axle thereby securing the foot plate to the velocipede. The front flange of the step plate 36 rests upon the tops of the horizontal sections of the backbone tube 26.

The steering fork tube 18 is larger in diameter than the combined diameters of the two backbone tubes 26, or the width of the backbone, and is on the front ends of the backbone tubes. The steering fork tube 18, as shown most clearly in Figs. 2 and 4, is provided with openings 40 of substantially the same diameter as the backbone tubes 26. These openings 40 are so located that the backbone tubes 26 are located side by side and close to each other, corresponding to the spacing of the backbone tubes. The forward end portions of the backbone tubes 26 are inserted in the openings 40 and extend into the steering fork tube 18 a substantial distance (as shown in Fig. 2) to provide a ledge on which the arc welding material 42 is deposited. The steering fork tube 18 is substantially greater in diameter than the backbone tubes 26 and is sufficiently short to permit a welding electrode to be inserted through the ends of the steering fork tube 18 to weld the tubes rigidly together by depositing welding material on the inner face of the steering fork tube and the outer faces of the backbone tubes. Since this welding material is located on the inside of the steering fork tube 18, and since the holes 40 are of substantially the same size as the backbone tube 26 the outside joint between the steering fork tube 18 and the backbone tubes 26 is clean and does not require any finishing operation such as removal of undesired material by grinding or the covering of the joint by the use of a shield.

Thus, the steps of joining together the forward end portions of the backbone tubes 26 and the steering fork tube 18 include forming the openings 40 in the fork tube 18 to receive the forward end portions of the backbone tubes 26, inserting the forward end portions of the backbone tubes 26 into the openings 40 far enough into the steering fork tube 18 so that a continuous ledge is formed but with the forward end of the backbone tubes 26 located so that they do not extend into the space within the steering fork tube 18 which is to be occupied by the steering post of the front fork 16. The backbone tubes 26 are then welded to the steering fork tube 18. The welding operation as above stated is accomplished by inserting the welding electrode through each of the open ends of the large steering fork tube 18. After the welding operation has been completed, end caps 44 are pressed on the ends of the steering fork tube 18.

The end caps 44 are provided with openings 46, the edge portions of which are provided with inwardly extending flanges 48 to provide bearings for the front wheel fork 16. As shown in Fig. 4, the front wheel fork 16 has fixed thereto a post 50 which extends substantially vertically and is connected with the handle bar supporting tube 21. A bearing collar 52 which preferably is fixed to the steering post 50 bears against the lower cap 44 and thus receives the larger portion of the weight of the velocipede and the rider thereon. The steering post 50 is also provided with a second collar 54 which bears against the upper cap 44 and is fixed to the steering post by a set screw 56. Thus, the steering or front wheel fork 16 is rotatably secured to the steering fork tube 18 by the collars 52 and 54 which prevent axial movement of the steering fork 16 relatively to the steering fork tube 18 while at the same time permitting relative rotative movement between the fork and the steering fork tube.

The modification illustrated in Figs. 5 and 6 differs from the modification shown in the preceding four figures in providing a single backbone tube 58 in place of the two backbone tubes 26 shown in the other figures. In this modification, an opening 60 is formed in the steering fork tube 18 to receive the forward end portion of the tube 58. The forward end portion of the tube 58 is inserted in the opening 60 and is arc welded to the inside of the tube 18 in substantially the same manner that the two tubes 26 were welded to the steering fork tube 18.

While the opening or openings in the side wall of the steering post tube to receive the backbone tube or tubes are substantially the same diameter as the backbone tube or tubes, due to the relatively thin wall of the steering post tube, the backbone and steering post tubes can assume different angles, as indicated by the full and dotted lines, Fig. 4, and welded rigidly together in any selected angular relation without the necessity for joining the backbone tube holes at an angle in the steering post tube. This is advantageous as the tubes often are required to be united at other than a right angular relation.

The construction above described also can be used to join other cross tubes of a velocipede and Fig. 7 illustrates the application of the invention in uniting the handle bar 20 to its supporting tube 21. In this figure the supporting tube 21 has a pair of diametrically opposed holes 62 drilled or otherwise formed in the side wall of the tube near the open end thereof and the handle bar 20 is threaded through the openings. The two tubes are then welded together by the deposition of welding material 64 on both tubes applied by a welding electrode inserted into the open end of the tube 21. The open end of the tube 21 can be subsequently closed by an end cap 66 pressed thereon.

I claim:

1. In a velocipede, a backbone including a backbone tube, a steering fork tube larger in diameter than said backbone tube having a hole in its side wall close to an open end thereof and through which the forward end of said backbone tube projects and closely conforms to the outline of said hole, the end of said backbone tube being terminated a substantial distance from the inner face of the wall of said steering fork tube within the interior thereof to form a continuous shelf for welding material but said end being remote from the opposite wall of the steering fork tube, said tubes being welded together by exposed welding material applied through the open end of said steering fork tube and bonded to the inner face of said steering fork tube and the outer face of said backbone tube, and end caps on the ends of said steering fork tube concealing said welding material and having steering post bearings therein, and a steering post in said bearings within and in the axial line of said steering fork tube and in front of the end of said backbone tube.

2. A velocipede having a backbone tube with a rear axle and rear wheels thereon, a generally vertical steering fork tube on the generally horizontal front end part of the backbone tube, a steering fork having a front wheel therein and journalled in the steering fork tube, the steering fork tube being short and much larger in diameter than the backbone tube and the backbone tube having its front cylindrical end portion projected through an opening in the side wall of the steering fork tube and inwardly beyond the inner face of the fork tube all around, but terminated clear of the steering fork therein, the steering fork tube having a thin wall at the opening through which the backbone tube passes to allow the backbone tube to be tilted in the opening to adjust the angular position of the tubes, and the inwardly projecting part of the backbone tube constituting a welding-material receiving ledge, and welding material deposited on the ledge and bridging the junction of and bonded to both tubes, the steering fork tube being short to allow the welding material being deposited on the ledge through both open ends of the steering fork tube, and end caps on and constituting closures for the open ends of the steering fork tube having bearings for said steering fork.

3. A velocipede having a backbone comprising a pair of backbone tubes which are parallel and substantially contiguous in the forepart of the backbone, a steering fork tube on the front ends of the backbone tubes, a steering fork journalled in said steering fork tube coaxially therewith, the steering fork tube being larger in diameter than the combined diameters of the backbone tubes and the cylindrical front end parts of said tubes being projected through the side wall of said steering fork tube and inwardly beyond the inner face of said wall all around but terminated clear of the steering fork, welding material deposited on the backbone tubes internally of the steering fork tube and on the inner face of the steering fork tube bonding the backbone tubes rigidly together and to the steering fork tube, and bearing means for said fork at the ends of said steering fork tube constituting means concealing said welding material.

4. In a velocipede, a pair of rear-wheel supporting backbone members extending forward in contiguous parallel relation, a short front-wheel supporting steering fork tube having its interior diameter greater than the exterior diameter of one of said backbone members and having contiguous openings through its side wall in which the entire forward ends of the backbone members extend and project interiorly of the fork tube approximately at right angles to the interior surface of the fork tube and terminating short of the longitudinal axis of the fork tube, welding material deposited on the inner surface of the steering fork tube and the outer surface of the backbone members entirely interiorly of the steering fork tube rigidly bonding said members together and to said tube, end caps closing the ends of said steering fork tube concealing said welding material, and a steering fork passed through said end caps and tube in front of the inner ends of said backbone members, said end caps constituting bearings for said steering fork.

5. In a velocipede having a backbone tube, a short steering fork tube that is larger in internal diameter than the external diameter of said backbone tube having a hole in its side wall through which the forward end part of said backbone tube is extended, means located entirely within said steering fork tube joining said steering fork and backbone tubes rigidly together, a steering fork in said steering fork tube in front of the forward end of said backbone tube, a wheel carried by said steering fork, and cover means for at least the upper open end of said steering fork tube constituting a closure therefor concealing said joining means and also constituting a bearing for said steering fork.

JOHN A. CONTI.